(12) United States Patent
Greiwe et al.

(10) Patent No.: US 6,761,762 B1
(45) Date of Patent: Jul. 13, 2004

(54) EFFECT PIGMENTS COATED WITH REACTIVE ORIENTATION AIDS

(75) Inventors: Klaus Greiwe, Lauf (DE); Alfried Kiehl, Schnaittach (DE)

(73) Assignee: Eckart-Werke Standard Bronzepulver-Werker Carl-Eckart GmbH & Co., Furth (DE)

( * ) Notice: Subject to any disclaimer, the term of this patent is extended or adjusted under 35 U.S.C. 154(b) by 0 days.

(21) Appl. No.: 09/674,633

(22) PCT Filed: May 3, 1999

(86) PCT No.: PCT/DE99/01333

§ 371 (c)(1),
(2), (4) Date: Jan. 2, 2001

(87) PCT Pub. No.: WO99/57204

PCT Pub. Date: Nov. 11, 1999

(30) Foreign Application Priority Data

May 6, 1998 (DE) .......................... 198 20 112

(51) Int. Cl.⁷ ................................ C09C 1/62
(52) U.S. Cl. ..................... 106/403; 106/483
(58) Field of Search ................. 106/403, 482

(56) References Cited

U.S. PATENT DOCUMENTS

| | | | | |
|---|---|---|---|---|
| 6,160,067 A | * | 12/2000 | Eriyama et al. | 526/279 |
| 6,176,918 B1 | * | 1/2001 | Glausch et al. | 106/415 |
| 2001/0056135 A1 | * | 12/2001 | Kieser et al. | 523/171 |

FOREIGN PATENT DOCUMENTS

| | | | | |
|---|---|---|---|---|
| DE | 3930687 | | 4/1991 | |
| DE | 634459 | * | 6/1994 | ............ C09C/3/12 |
| EP | 268918 A1 | | 6/1988 | |
| EP | 406731 A2 | | 1/1991 | |
| EP | 416395 A2 | | 3/1991 | |
| EP | 0 634 459 | | 1/1995 | |
| EP | 679700 A2 | | 11/1995 | |
| EP | 688833 A2 | | 12/1995 | |
| WO | WO 96/32446 | * | 10/1996 | ............ C09C/1/00 |
| WO | WO 97/12942 | | 4/1997 | |
| WO | WO 97/29059 | | 8/1997 | |

OTHER PUBLICATIONS

Ullmann's Encyclopedia of Industrial Chemistry, vol. A20, pp. 243–245, 356 (1992).

Hollemann Wiberg, Lehrbuch de anorganischen Chemie, 101, Edition, pp. 779–781 (1995).

DIN 55944, Apr. 1990.

Wheeler, Ian R., "Aluminium Pigments—A History of Development", *European Coatings Journal*, pps 382–389 (Jun. 1994).

* cited by examiner

*Primary Examiner*—C. Melissa Koslow
*Assistant Examiner*—Shalie Manlove
(74) *Attorney, Agent, or Firm*—Hoffmann & Baron, LLP

(57) ABSTRACT

The subject of the invention is an effect pigment which is coated with surface-modifying agents, wherein the initial pigment has a layer with at least one reactive surface-modifying agent, wherein the surface-modifying agent is a compound which has at least two functional groups which are different from each other and which are spaced by a spacer, chemically bound to the initial pigment. Also described is a process for the production of an effect pigment of that kind.

4 Claims, No Drawings

EFFECT PIGMENTS COATED WITH REACTIVE ORIENTATION AIDS

The present invention concerns effect or fancy pigments whose service is modified with orientation aids.

BACKGROUND OF THE INVENTION

The literature (EP 0 634 459 A2) describes coating pearl shine pigments with alkyl silanes to improve orientation of the pigments in the ambient medium (paint or lacquer, casting resin etc). The modification process used in that case controls the wetting characteristics of the pearl shine pigments by the introduction of hydrophobing alkyl silanes and results in a leafing effect, as is also known in relation to metal effect pigments.

The application of stearic acid to the pigment surface means that aluminium pigments can also be strongly hydrophobed, which then results in poorer wetting of the pigments by the individual components of the paint or lacquer. The content of the pigments is then increased at the interfaces (or the surface) of the liquid film of paint or lacquer. As after hardening of the film of paint or lacquer that results in coatings with a high level of brilliance, this is referred to as good orientation characteristics in respect of the pigments ('leafing effect'). The aluminium pigments which are oriented at the surface are however not particularly resistant to weathering as they are not enclosed in the film of paint or lacquer and thus protected from corrosion. In the case of metallic paints for automobiles, which must satisfy particularly high levels of weathering stability, therefore only aluminium pigments which are non-leafing (which can be well wetted) are used. Paints in the automobile sector involve a layer structure which in the case of metallic paints generally consists of five layers. Disposed on the metallic substrate is a phosphate layer, followed by a cathodic dip lacquering (CDL), a filler layer (to compensate for irregularities and unevenness etc), the base lacquer and finally the clear lacquer. The actual layer which affords the effect is the base lacquer which generally contains a mixture of metal pigments and pearl shine pigments and which nowadays is already used in many cases in the form of a water-based lacquer. The clear lacquer serves to protect the base lacquer and to 'smooth out' the surface.

An important check in terms of the resistance of metallic lacquers is the so-called condensed water test. In that case the complete coating is exposed to a condensed water testing climate (DIN 50 017) and then checked in terms of its mechanical strength and visual considerations. In the ideal case the properties of the coating should not change before and after the test. In a worse scenario, there is a loss of adhesion between the base lacquer and the clear lacquer or a loss of adhesion between the effect pigments and the base lacquer. Such changes can be seen in the cross-cutting adhesion test or the stone impact test. A negative test result involves partial detachment of the clear lacquer from the base lacquer or even involves the base lacquer layer completely breaking away. In addition, under some circumstances optical changes are also to be observed due to the action of water vapour on the coating (a greying effect, swelling, etc).

A disadvantage of coating effect pigments with hydrophobing alkyl silanes (for example EP 0 634 459 A2) are the weak bonding forces at the pigment/binding agent interface (van der Waals forces, hydrogen bridges). Because of those weak bonding forces the pigments are incompletely wetted, in particular in aqueous lacquer systems, which results in the pigments being poorly bound into the coating. As a result, both the adhesion of the pigments in the base lacquer layer and also the adhesion between the base lacquer and the clear lacquer are adversely affected. That impaired adhesion then results in worse results in the condensed water test.

The diffusion of water vapour through the clear lacquer into the base lacquer has a severely adverse effect on adhesion between the two layers in the condensed water test if condensation of water occurs between the base lacquer and the clear lacquer. That is the case in particular if the coated pigments cannot be wetted or can be only poorly wetted by the binding agents or solvents of the paint or lacquer (organic solvent and/or water) because the pigments are then at the surface of the base lacquer and are in direct contact with respect to the clear lacquer. In that case the reduced level of resistance to condensed water results under some circumstances in the lacquer layers completely breaking away under the action of shearing forces (cross-cut test, stone impact test, etc).

SUMMARY OF THE INVENTION

Therefore the object of the present invention is to provide effect pigments which on the one hand are easily wetted by the binding agent or solvent of the paint or lacquer and which can be well oriented in the liquid film of lacquer and which on the other hand involve an intimate bond with the surrounding binding agent matrix and therefore do not suffer from the above-described disadvantages involved in use thereof.

DETAILED DESCRIPTION OF THE INVENTION

That object is attained in that the initial pigment has a layer comprising at least one reactive surface-modifying agent, wherein the surface-modifying agent is a compound which has at least two functional groups which are different from each other and which are spaced by a spacer and of which at least one functional group is chemically bound to the initial pigment.

At least one functional group which is directed outwardly, that is to say towards the binding agent, of the effect pigment according to the invention can react chemically with the binding agent in that case in a kind of cross-linking reaction. By virtue of the resulting strongly covalent bonding forces at the pigment/binding agent interface, water vapour in the finished coating can only diffuse with difficulty into the pigmented binding agent matrix. The strong linkage of the pigments to the binding agent of the base lacquer, which is caused by the relatively good wettability of the metal pigments coated with the reactive orientation agent means that there cannot be condensation and thus inclusion of water between the clear lacquer and the base lacquer. Therefore even coatings which are soaked with solvent (for example water) are highly stable in respect of shearing and impact-resistant. An effect pigment which is treated in that way has accordingly become a 'chemical constituent' of the ambient medium.

The effect pigments according to the invention involve either metal pigments such as aluminium, copper, zinc, gold-bronze, titanium (EP 0 796 688), zirconium, tin, iron (EP 0 673 980) and steel pigments or pigments of alloys of the above-mentioned metals. The effect pigments can also comprise flake-form glass, $Al_2O_3$, $SiO_2$ (EP 0 803 550 A2), $TiO_2$ or mica. Multi-layer pigments (DE 44 05 492 A1, EP 0 708 154; DE 196 18 569) or pearl shine pigments or mixtures thereof can also be coated in accordance with the invention. The pigments may carry a coating of metal oxides such as $SiO_2$ (for example: U.S. Pat. No. 2,885,366, U.S. Pat. No. 3,954,496, EP 0 678 561, DE 195 01 307, EP 0 708 155), $TiO_2$ (for example: 0 338 428), $Al_2O_3$ (for example: DE 195 20 312, EP 0 560 144) and $Fe_2O_3$ (for example: EP 0 033 457, EP 0 806 457) or organic polymers such as acrylate, methacrylate etc (for example: DE 40 30 727, EP 0 416 369). The particle size is between 1 and 200 μm.

The described demands on an orientation aid are satisfied in accordance with the invention by a bonding agent which carries two or more functional groups. One group of the bonding agent reacts with the surface of the effect pigment, which surface is possibly occupied by oxides. Alkoxysilyl groups (for example methoxy and ethoxy silanes), halosilanes (for example chlorosilanes) or acid groups of phosphoric acid esters or phosphonic acids and phosphonic acid esters are considered here. The described groups are linked by way of spacers of greater or lesser length to a second, lacquer-friendly group. The spacer involves unreactive alkyl chains, siloxanes, polyethers, thioethers or urethanes or combinations of those groupings of the general formula $(C,Si)_n H_m (N,O,S)_x$ with n=1–50, m=2–100 and x=0–50. The lacquer-friendly group preferably involves acrylates, methacrylates, vinyl compounds, amino or cyano groups, isocyanates, epoxy, carboxy or hydroxy groups. Upon baking or hardening of the coating those groups chemically react with the ambient medium in a cross-linking reaction in accordance with the known chemical reaction mechanisms.

The effect pigments according to the invention are produced by agitating and heating the initial pigments in an organic solvent, mixing with a solution of a base in water or another solvent, adding the surface-modifying agent, cooling after 15 minutes to 24 hours of reaction time, and suction removal. The filter cake obtained can be dried in a vacuum at about 60°–130° C.

Silane-based surface-modifying agents are described for example in DE 40 11 044 C2. Phosphoric acid-based surface-modifying agents can be obtained inter alia as Lubrizol® 2061 and 2063 from LUBRIZOL (Langer & Co).

The surface-modifying agent can also be produced directly on the pigment by chemical reaction from suitable starting substances. In that case the effect pigments are also agitated and heated in an organic solvent. They are then mixed with the solution of a base. Preferably organic amines are used for the metal effect pigments which react with water, while predominantly mineral bases are used for the mineral effect pigments. There is then added a bonding agent which chemically reacts with the effect pigments and which is firmly bound to the pigment surface. That bonding agent is then reacted by way of a further functional group, possibly in the presence of an initiator (radical-forming agent, acids, bases etc) with a cross-linking agent, in which case however only a part of the functional groups of the cross-linking agent reacts with the bonding agent and another part remains free, that is to say it remains further capable of reaction. After about 1–6 hours of reaction time the pigment suspension is cooled and subjected to suction removal. The filter cake obtained in that way can be dried in a vacuum at 60°–130° C.

The reaction can also be conducted in a solvent in which the coated effect pigments are later formed as a paste and used. That renders a drying step redundant. Specific examples of bonding agents that can be mentioned are for instance cross-linkable organo-functional silanes which after the hydrolysis operation are anchored with their reactive Si—OH units on the (partially oxidic) surface of the effect pigments. The potentially cross-linkable organic groups can later react with the lacquer binding agents. Examples of cross-linkable organo-functional silanes are as follows:

Vinyl trimethoxy silane, aminopropyl triethyoxy silane, N-ethylamino-N-propyl dimethoxy silane, isocyanatopropyl triethoxy silane, mercaptopropyl trimethoxy silane, vinyl triethoxy silane, vinyl ethyl dichlorosilane, vinyl methyl diacetoxy silane, vinyl methoyl dichlorosilane, vinyl methyl diethoxy silane, vinyl triacetoxy silane, vinyl trichlorosilane, phenyl vinyl diethoxy silane, phenyl allyl dichlorosilane, 3-isocyanatopropoxyl triethoxy silane, methacryloxy propenyl trimethoxy silane, 3-methacryloxy propyl trimethoxy silane, 3-glycidyloxypropyl trimethoxy silane, 1,2-epoxy-4-(ethyl triethoxysilyl)-cyclohexane, 3-acryloxypropyl trimethoxy silane, 2-methacryl-oxyethyl trimethoxy silane, 2-acryloxyethyl trimethoxy silane, 3-methacryloxypropyl triethoxy silane, 3-acryloxypropyl trimethoxy silane, 2-methacryloxyethyl triethoxy silane, 2-acryloxyethyl triethoxy silane, 3-methacryloxypropyl tris(methoxyethoxy)silane, 3-methacryloxypropyl tris(butoxyethoxy)silane, 3-methacryloxypropyl tris(propoxy)silane, 3-methacryloxypropyl tris(butoxy)silane, 3-acryloxypropyl tris(methoxyethoxy)silane, 3-acryloxypropyl tris(butoxyethoxy)silane, 3-acryloxypropyl tris(propoxy)silane, 3-acryloxypropyl tris(butoxy)silane. 3-Methacryloxypropyl trimethoxy silane is particularly preferred.

These and other silanes are commercially available for example from ABCR GmbH & Co, D-76151 Karlsruhe, or Sivento Chemie GmbH, D-40468 Düssseldorf.

Vinyl phosphonic acid or vinyl phosphonic acid diethyl ester can also be listed here as bonding agents (manufacturer: Hoechst AG, Frankfurt am Main).

If acrylate/methacrylate silanes are used as bonding agents, it is possible to use the following multi-functional acrylates or methacrylates as cross-linking agents:

Tetraethylene glycol diacrylate (TTEGDA), triethylene glycol diacrylate (TIEGDA), polyethylene glycol-400-diacrylate (PEG400DA), 2,2'-bis(4-acryloxyethoxyphenyl) propane, ethylene glycol dimethacrylate (EGDMA), diethylene glycol dimethacrylate (DEGDMA), triethylene glycol dimethacrylate (TRGDMA), tetraethylene glycol dimethacrylate (TEGDMA), butane-1,3-diol dimethacryiate (1,3-BDDMA), butane-1,4-diol dimethacrylate (1,4-BDDMA), hexane-1,6-diol dimethacrylate (1,6-HDMA), dodecane-1,12-diol dimethacrylate (1,12-DDDMA), neopentyl glycol dimethacrylate (NPGDMA), trimethylol propane trimethacrylate (TMPTMA) and hexane-1,6-diol diacrylate (1,6-HDDA). Trimethylol propane trimethacrylate (TMPTMA) is particularly preferred.

When using epoxy silanes as bonding agents for example it is possible to use the following multi-functional amines as cross-linking agents: 3,3-dimethyl-4,4-diaminodicyclohexyl methane, ethylene diamine, triethylene tetramine, meta-xylylene diamine, N-aminoethyl piperazine, 2-methyl- 1,5-pentamethylene diamine, 1,2-diaminocyclohexane and isophorone diamine.

If amino silanes are used as bonding agents it is possible to use for example the following multi-functional epoxy compounds as cross-linking agents: butane-1,4-diol diglycidyl ether, glycerine triglycidether, neopentylglycol diglycidyl ether, pentaerythritol polyglycidether, hexane-1,6-diol diglycidether, polypropylene glycol diglycidyl ether and trimethylol propane triglycidether.

The specified acrylates and methacrylates can be obtained for example from Elf Atochem, D-40401 Dusseldorf, Röhm, Darmstadt and Servo, 7490 AA Delden (Netherlands). All the mentioned multi-functional amine and epoxy compounds are commercially available, thus for example from UPPC, D-88487 Mietringen-Baltringen.

Commercially available organic peroxides but also inorganic peroxides and diazo compounds can be used as thermal initiators. Examples of such peroxides are diacetyl peroxides such as acetyl-cyclohexane-sulphonyl peroxide, bis(2,4-dichlorobenzoyl) peroxide, diisononanoyl peroxide, dioctanoyl peroxide, diacetyl peroxide and dibenzoyl peroxide; peroxydicarbonates (for example diisopropyl peroxydicarbonate, di-n-butylperoxydicarbonate, di-2-ethylhexyl-peroxydicarbonate, dicyclohexyl-peroxydicarbonate), alkyl peresters (for example cumyl perneodecanoate, t-butyl-perneodecanoate, t-amyl-perpivalate, t-butyl-per-2-ethylhexanoate, t-butyl-perisobutyrate, t-butyl perbenzoate), dialkyl peroxides (for example dicumyl peroxide, t-butylcumyl peroxide, 2,5-dimethylhexane-2,5-di-t-butyl peroxide, di(t-butylperoxyisopropyl)benzene, di-t-butylperoxide or 2,5-dimethylhexine-3-2,5-di-t-butyl peroxide), perketals (for example 1,1'-bis(t-butylperoxy)-3,3,5-trimethylcyclohexanone peroxide, methylisobutyl ketone peroxide, methyl ethyl ketone peroxide or acetyl acetone peroxide), alkyl hydroperoxides (for example pinane hydroperoxide, cumol hydroperoxide, 2,5-dimethyl hexane-2,5-dihydroperoxide or t-butylhydroperoxide), azo compounds (for example 4,4'-azo-bis(4-cyanovaleric acid), 1,1'-azo-bis(cyclohexane carboxylic acid nitrile), 2,2'-azo-bis (isobutyric acid amidine) dihydrochloride, 2,2'-azo-bis (isobutyric acid nitrile)) or persulphates such as sodium peroxydisulphate and potassium peroxodisulphate. Particularly preferred is 2,2'-azo-bis(isobutyric acid nitrile).

The specified compounds are commercially available from Aldrich Chemie, D-89552 Steinheim.

The sectors of use of the described invention are primarily aqueous paints and lacquers and printing inks. Here the described process provides for a brilliant shiny appearance of the effect pigments with at the same time good adhesion (cross-cutting test, Tesa test) and mechanical stability (stone impact test). The good adhesion of the coating is maintained even under the action of aggressive and corrosive media such as condensed water (for example the condensed water test in accordance with DIN 50 017). Even in powder lacquers and plastic materials the invention improves the bond of the pigments to the ambient medium and thus the mechanical and chemical properties of the coating system.

In accordance with the invention it is also possible to provide on the initial pigment a layer which includes side by side one or more of the above-mentioned hydrophobing alkyl silanes (for example described in EP 0 634 459 A2) and at least one of the reactive orientation aids described herein. Depending on the specific demands made on the pigment, the proportion of the surface-modifying agent described herein in that layer can basically be between 10% and 100%. It is particularly preferred however if the proportion is 10, 30, 50, 75 or 100%, as that provides for graduation of the operative bonding forces, such as to do justice to the most frequently occurring demands in a practical context. That provides for both improved orientation of the pigments in the lacquer, which is greater in accordance with the content of reactive orientation aids, and also strengthened binding in the hardened film of lacquer.

It is to be mentioned in general terms that the aluminium pigments according to the invention which are coated with a layer comprising a reactive surface-modifying agent can be dispersed markedly more easily than for example chromated aluminium types (for example Hydrolux types, Eckart-Werke). The dispersion of Al-pigments is a critical step as the Al-flakes can be mechanically damaged by the application of high levels of shearing energy. Lacquer films with such damaged pigments exhibit an unwanted 'greyed' appearance (the metallic shine of such coatings is markedly reduced).

Paints and printing inks which contain pigments in flake form cause problems in terms of handling insofar as, because of their size and density in comparison with the medium surrounding them, the pigments can easily settle and then cake together to form a solid sediment cake. That applies primarily in regard to mineral and oxidic effect pigments. The pigments according to the invention described herein do not settle in a lacquer so easily as a bottom sediment in comparison with the non-coated initial material, or after sedimentation they can be re-dispersed again markedly more easily.

Surface-modified flake pigments with improved settlement and sediment-agitation characteristics have already been described. EP 0 515 928 refers to coating pigments with a polyacrylate or polymethacrylate or salts thereof. There is no disclosure of more detailed information regarding the polyacrylates used so that the structural configuration of the coating is also unknown. This coating also does not contribute to improving orientation and thus the optical properties of the pigments; this coating also cannot make any contribution to controlling the wetting characteristics or improved adhesion.

EP 0 523 357 describes flake substrates which are coated with a modifying reagent comprising binding agent and particles in fibre form, to improve the settlement and sediment-agitation characteristics. The fibres prevent the coated substrates resting on each other by virtue of steric repulsion and thus being able to entail strong adhesion to each other. The fibres however are not/do not become chemically firmly anchored on the pigment surface or in the binding agent medium so that the fibres can become detached and can adversely influence the rheology of the lacquer or the printing ink.

PCT WO 96/32446 describes various compounds having epoxy groups, which together are intended to improve the settlement characteristics and also the weathering of pigments in flake form. As only similar reactive groups are present, a specifically targeted and oriented construction of a reactive orientation aid on the pigment surface is not possible.

Passivated Al-pigments for use in aqueous base lacquers (EP 0 259 592) are produced inter alia in the form of aqueous pigment pastes. Stability in terms of storage of such pastes which are produced in accordance with EP 0 259 592 is severely limited in terms of time as, in spite of passivation, the highly exothermic reaction of water with aluminium, with the formation of hydrogen, cannot be entirely stopped. The described modified new types of pigment on an aluminium basis have markedly prolonged stability in terms of storage, in comparison with passivated chromated aluminium types (Hydrolux types, Eckart-Werke).

Table 1 compares the properties in terms of use of various coated aluminium pigments (fineness $D_{50}$=18–20 mm) in a commercially available aqueous lacquer system. It can be clearly seen that the $SiO_2$-coated pigment quality V2521 which is surface-modified with the described bonding agents at least achieves and in part even exceeds the properties profile of commercially available chromated types (Hydrolux 8154, Eckart-Werke). Type V2421 involves $SiO_2$-coated pigments which are modified with alkyl silanes while PCR 8154 (Eckart-Werke) which is available on the market is coated with pure $SiO_2$.

Table 1:

ME-values, condensed water test and stone impact test on coated aluminium pigments.

Layer structure: phosphated steel sheet, KTL, filler, commercially available water-based lacquer on a polyurethane/polyacrylate base, 1K-High-Solid clear lacquer.

| Type[1] | ME-value[2] | Cross-cutting test Gtc[3] | Stone impact test[4] |
|---|---|---|---|
| PCR 8154 | 284 | − | − |
| Hydrolux 8154 | 400 | + | + |
| V2421 | 414 | − | − |
| V2521 | 383 | +/++ | +/++ |

− = inadequate
+ = good
++ = very good
[1] Detailed description in the text
[2] Measurement with goniophotometer GP 3 (Zeiss), typical values.
[3] Checking immediately after the condensed water test in accordance with DIN 50 017.
[4] 450 g of steel balls (Ø 3–5 mm) are accelerated under free fall in a vertical tube (6 m in length) and impinge at the end of the tube on the sheet which is lacquered as described.

EXAMPLE 1

100 g of coated aluminium pigment (for example PCR 8154, Eckart-Werke) is agitated in 500 ml of ethanol for 10 minutes. The suspension is heated with agitation to 80° C. and mixed with a solution of 2.34 g of triethylamine in 26 ml of water. After a further 5 minutes 1 g of 3-methacryloxypropyl trimethoxy silane is added to the mixture. 30 minutes later 2 g of trimethylolpropane trimethacrylate is added to the mixture, followed immediately by 30 mg of α, α'-azo-isobutyronitrile. The entire mixture is stirred for a further period of 4 hours at 80° C. The mixture is then allowed to cool down and the finished-coated pigment is subjected to suction removal. Finally the filter cake is dried at 90° C. in a vacuum.

The pigment powder is applied in a commercially available aqueous binding agent system. The freshly lacquered test sheet is pre-dried at 80° C. in a drying cabinet (10 minutes). The clear lacquer is then applied and the finished coating is baked at 130° C. (30 minutes).

EXAMPLE 2

100 g of coated aluminium pigment is modified as described in Example 1. Instead of 2.34 g of triethylamine 1.17 g of ethylene diamine is used.

EXAMPLE 3

100 g of a commercially available pearl shine pigment (for example Flonac MI 11, Eckart-Werke) is modified as described in Example 1. 26 ml of 1 N KOH is used as the base.

EXAMPLE 4

100 g of coated aluminium pigment is modified as described in Example 1. Instead of 1 g of 3-methacryloxypropyl trimethoxy silane 1 g of vinyl trimethoxy silane is used.

EXAMPLE 5

100 g of oxidised aluminium pigment (for example in accordance with PCT/DE96/00890) is agitated in 500 ml of ethanol for 10 minutes. The suspension is heated with agitation to 80° C. and mixed with a solution of 2.34 g of triethylamine in 26 ml of water. After a further 5 minutes 2 g of urethane methacrylate alkoxy silane (H Wolter et al, Polymer & Materials Research Symposium 1993, Bayreuth, pages 14–17) is added to the mixture. 30 minutes later 2 g of trimethylol propane trimethacrylate is added to the mixture, followed immediately by 50 mg of α, α'-azo-isobutyronitrile. The entire mixture is agitated for a further 6 hours at 80° C. The mixture is then allowed to cool down and the finished-coated pigment is subjected to suction removal. Finally the filter cake is dried at 90° C. in a vacuum.

The pigment powder is applied in a commercially available aqueous binding agent system. The freshly lacquered test sheet is pre-dried at 80° C. in a drying cabinet (10 minutes). Then the clear lacquer is applied and the finished coating baked at 130° C. (30 minutes).

EXAMPLE 6

As Example 5, but instead of urethane methacrylate alkoxy silane and trimethylol propane trimethacrylate (see Example 5) 3 g of the adduct of 3-mercaptopropyl trimethyoxy silane to trimethylol propane trimethacrylate (H Wolter et al, Mat. Res. Soc. Symp. Proc. Vol 271, page 719, 1992) is used.

EXAMPLE 7

As Example 6, but using a commercially available trialkoxysilyl-substituted polyethylene imine.

EXAMPLE 8

As Example 6 but with the addition of a commercially available polyethylene/acrylic acid copolymer.

EXAMPLE 9

As Example 1 but using a mixture comprising 1 g of 3-methacryloxypropyl trimethoxy silane and 1 g of hexadecyl trimethoxy silane instead of 3-methacryloxypropyl trimethoxy silane and trimethylol propane trimethacrylate.

EXAMPLE 10

As Example 1, but using 100 g of a commercially available pearl shine pigment (for example Flonac MI 11, Eckart-Werke).

We claim:
1. A process for the production of a surface modified effect pigment, which effect pigment comprises an initial pigment having on its surface a layer with at least one reactive organic solvent based surface-modifying agent, wherein the surface-modifying agent is a compound having at least two terminal functional groups which are different from each other and which are spaced by a spacer, wherein at least one functional group is chemically bound to the initial pigment, and wherein the effect pigment is of a particle size between about 1 and about 200 µm, is easily wetted by a binding agent or solvent of a paint or lacquer and is capable of being oriented in a liquid film of paint or lacquer, said process comprising:

agitating and heating said initial pigment in an organic solvent;

mixing the initial pigment with a solution of a base in water or in another solvent;

adding said organic solvent based surface-modifying agent to the mixture;

cooling the mixture after 15 minutes to 24 hours; and removing liquid from the mixture to form a filter cake of said effect pigment.

2. A process for the production of a surface modified effect pigment, which effect pigment comprises an initial pigment having on is surface a layer with at least one reactive organic solvent based surface-modifying agent, wherein the surface-modifying agent is a compound having at least two terminal functional groups which are different from each other and which are spaced by a spacer, wherein at least one functional group is chemically bound to the initial pigment, and wherein the effect pigment is of a particle size between about 1 and about 200 $\mu$m, is easily wetted by a binding agent or solvent of a paint or lacquer and is capable of being oriented in a liquid film of paint or lacquer, said process comprising:

agitating and heating said initial pigment in an organic solvent;

mixing the initial pigment with a solution of a base;

adding a bonding agent to the mixture, which chemically reacts with the initial pigment and bonds to the surface of the pigment;

reacting the bonding agent with a cross-linking agent having functional groups, wherein only a portion of the functional groups of the cross-linking agent react with the bonding agent; and cooling and removing liquid from the mixture to form a filter cake of said effect pigment.

3. The method according to claim 1, further comprising the step of drying the filter cake.

4. The method according to claim 2, further comprising the step of drying the filter cake.

* * * * *

UNITED STATES PATENT AND TRADEMARK OFFICE
CERTIFICATE OF CORRECTION

PATENT NO. : 6,761,762 B1
DATED : July 13, 2004
INVENTOR(S) : Greiwe et al.

It is certified that error appears in the above-identified patent and that said Letters Patent is hereby corrected as shown below:

Column 4,
Line 44, now reads "dimethacryiate" should read -- dimethacylate --;

Column 9,
Line 6, now reads "on is surface" should read -- on its surface --.

Signed and Sealed this

Fifth Day of October, 2004

JON W. DUDAS
*Director of the United States Patent and Trademark Office*